(12) United States Patent
Yang et al.

(10) Patent No.: US 7,964,858 B2
(45) Date of Patent: Jun. 21, 2011

(54) ULTRAVIOLET REFLECTOR WITH COOLANT GAS HOLES AND METHOD

(75) Inventors: Yao-Hung Yang, Sunnyvale, CA (US); Tuan Anh Nguyen, Sunnyvale, CA (US); Sanjeev Baluja, Sunnyvale, CA (US); Andrzej Kaszuba, San Jose, CA (US); Juan Carlos Rocha, San Carlos, CA (US); Thomas Nowak, Cupertino, CA (US); Dustin W. Ho, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 226 days.

(21) Appl. No.: 12/255,609

(22) Filed: Oct. 21, 2008

(65) Prior Publication Data
US 2010/0096564 A1 Apr. 22, 2010

(51) Int. Cl.
G01N 21/33 (2006.01)
B01J 19/08 (2006.01)
B29C 35/08 (2006.01)

(52) U.S. Cl. ............... 250/504 R; 250/455.11; 362/345

(58) Field of Classification Search .............. 250/455.11, 250/504 R; 362/345
See application file for complete search history.

(56) References Cited

U.S. PATENT DOCUMENTS

| | | | |
|---|---|---|---|
| 4,048,490 A | 9/1977 | Troue | |
| 5,959,306 A | 9/1999 | Kalley et al. | |
| 6,098,637 A | 8/2000 | Parke | |
| 6,355,935 B1 | 3/2002 | Kalley et al. | |
| 6,630,682 B2 | 10/2003 | Shanley et al. | |
| 7,077,547 B2 * | 7/2006 | Schmitkons et al. | 362/345 |
| 7,091,137 B2 | 8/2006 | Lee et al. | |
| 7,663,121 B2 * | 2/2010 | Nowak et al. | 250/455.11 |
| 2004/0061079 A1 | 4/2004 | Thompson et al. | |
| 2004/0087184 A1 | 5/2004 | Mandal et al. | |
| 2005/0095859 A1 | 5/2005 | Chen et al. | |
| 2005/0250346 A1 | 11/2005 | Schmitt | |
| 2006/0022154 A1 | 2/2006 | Schmitkons et al. | |
| 2006/0105106 A1 | 5/2006 | Balseanu et al. | |
| 2006/0251827 A1 | 11/2006 | Nowak et al. | |
| 2006/0286774 A1 | 12/2006 | Singh et al. | |
| 2007/0228289 A1 | 10/2007 | Kaszuba et al. | |
| 2007/0228618 A1 | 10/2007 | Kaszuba et al. | |
| 2007/0232083 A1 | 10/2007 | Itani | |
| 2007/0252500 A1 | 11/2007 | Ranish et al. | |
| 2007/0256635 A1 | 11/2007 | Bour et al. | |

(Continued)

FOREIGN PATENT DOCUMENTS

JP 2006-147782 6/2006

(Continued)

OTHER PUBLICATIONS

International Search Report, Application No. PCT/US2009/061391, mailed May 19, 2010.

(Continued)

Primary Examiner — David A Vanore
(74) Attorney, Agent, or Firm — Janah & Associates

(57) ABSTRACT

A reflector for an ultraviolet lamp can be used in a substrate processing apparatus. The reflector comprises a longitudinal strip extending the length of the ultraviolet lamp. The longitudinal strip has a curved reflective surface and comprises a plurality of through holes to direct a coolant gas toward the ultraviolet lamp. A chamber that uses an ultraviolet lamp module with the reflector, and a method of ultraviolet treatment are also described.

44 Claims, 6 Drawing Sheets

U.S. PATENT DOCUMENTS

| | | |
|---|---|---|
| 2007/0257205 A1 | 11/2007 | Rocha-Alvarez et al. |
| 2007/0259110 A1 | 11/2007 | Mahajani et al. |
| 2007/0286956 A1 | 12/2007 | Samoilov |
| 2007/0286963 A1 | 12/2007 | Rocha-Alvarez et al. |
| 2008/0067416 A1 | 3/2008 | Ranish et al. |
| 2008/0067425 A1 | 3/2008 | Kaszuba et al. |

FOREIGN PATENT DOCUMENTS

| | | |
|---|---|---|
| JP | 2007-157583 | 6/2007 |
| JP | 2008-130888 | 6/2008 |
| WO | WO03088324 A2 | 10/2003 |
| WO | WO2006055459 A2 | 5/2006 |
| WO | WO2007002040 A2 | 1/2007 |
| WO | WO2007117583 A2 | 10/2007 |
| WO | WO2008005773 A2 | 1/2008 |

OTHER PUBLICATIONS

International Search Report, Application No. PCT/US2009/061380, mailed May 17, 2010.

* cited by examiner

ULTRAVIOLET REFLECTOR WITH COOLANT GAS HOLES AND METHOD

BACKGROUND

Embodiments of the present apparatus and method relate generally to the ultraviolet treatment of a substrate.

In the manufacture of integrated circuits, displays, and solar panels, layers of dielectric, semiconducting, and conducting materials are formed on a substrate such as a semiconductor wafer, glass panel or metal panel. These layers are then processed to form features such as electrical interconnects, dielectric layers, gates and electrodes. In other processes, ultraviolet radiation can be used to treat the layers or features formed on the substrate. For example, ultraviolet radiation can be used in rapid thermal processing (RTP) to rapidly heat a layer formed on the substrate. Ultraviolet radiation is also used to promote condensation and polymerization of polymeric layers. Ultraviolet radiation can also be used to generate stressed film layers. Ultraviolet radiation can also be used to activate gases to clean a chamber.

In one application, ultraviolet (UV) radiation is used to treat films of silicon oxide, silicon carbide, or carbon-doped silicon oxide. For example, commonly assigned U.S. Pat. Nos. 6,566,278 and 6,614,181, both incorporated by reference herein and in their entireties, describe the use of ultraviolet light for the treatment of silicon-oxygen-carbon films. Materials such as silicon oxide ($SiO_x$), silicon carbide (SiC), and silicon-oxygen-carbon ($SiOC_x$) films are used as dielectric layers in the fabrication of semiconductor devices. Chemical vapor deposition (CVD) methods are often used to deposit these films, and involve promoting a thermal or plasma based reaction between a silicon supplying source and an oxygen supplying source in a CVD chamber. In some of these processes, water can be formed as a by-product of the CVD or other reaction. For example, water can be formed in the deposition of silicon-oxygen-carbon or silicon carbide films by CVD processes that use an organosilane source which includes at least one Si—C bond. The process-generated water can be physically absorbed into the films as moisture or incorporated into the deposited film as Si—OH chemical bond, both of which are undesirable.

Ultraviolet radiation can be used to treat these films to cure and densify the deposited CVD film. Advantageously, ultraviolet treatment reduces the overall thermal budget of an individual wafer and speeds up the fabrication process. A number of ultraviolet curing chambers have been developed which can be used to effectively cure films deposited on substrates 38, such as, for example, U.S. application Ser. No. 11/124,908, filed May 9, 2005, and published as Patent Application Publication No. US 2006/0251827 A1 entitled "Tandem UV Chamber for Curing Dielectric Materials" which is assigned to Applied Materials, Inc., of Santa Clara, Calif. and incorporated by reference herein and in its entirety. In such ultraviolet processes, it is desirable to increase the intensity of the ultraviolet radiation to provide faster curing times and shorter process cycles. However, increasing the ultraviolet radiation by using high-power sources or other means also increases the heat generated within the chamber. This excessive heat can have adverse effects on the features being processed on the substrates and can also shorten the life of the ultraviolet sources themselves.

For reasons including these and other deficiencies, and despite the development of various UV curing chambers and techniques, further improvements in ultraviolet treatment technology are continuously being sought.

SUMMARY

A reflector for an ultraviolet lamp can be used in a substrate processing apparatus. The reflector comprises a longitudinal strip extending the length of the ultraviolet lamp. The longitudinal strip has a curved reflective surface and comprises a plurality of through holes to direct a coolant gas toward the ultraviolet lamp.

A substrate process chamber comprises a substrate support and ultraviolet lamp module comprising (i) an elongated ultraviolet lamp spaced apart from the substrate support, the ultraviolet lamp configured to transmit ultraviolet light toward the substrate support; and (ii) a primary reflector comprising (1) a central reflector comprising a longitudinal strip extending the length of the ultraviolet lamp, the longitudinal strip having a curved reflective surface and comprising a plurality of through holes provided to direct a coolant gas toward the ultraviolet lamp; and (2) first and second side reflectors positioned on either side of the central reflector.

A method of treating a substrate with ultraviolet radiation comprises providing a substrate in a process zone. An ultraviolet lamp is energized to generate ultraviolet radiation. A curved reflective surface is provided to reflect the generated ultraviolet radiation toward the substrate. A plurality of streams of coolant gas are directed through holes in the curved reflective surface to cool the ultraviolet lamp.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

Figure 1:
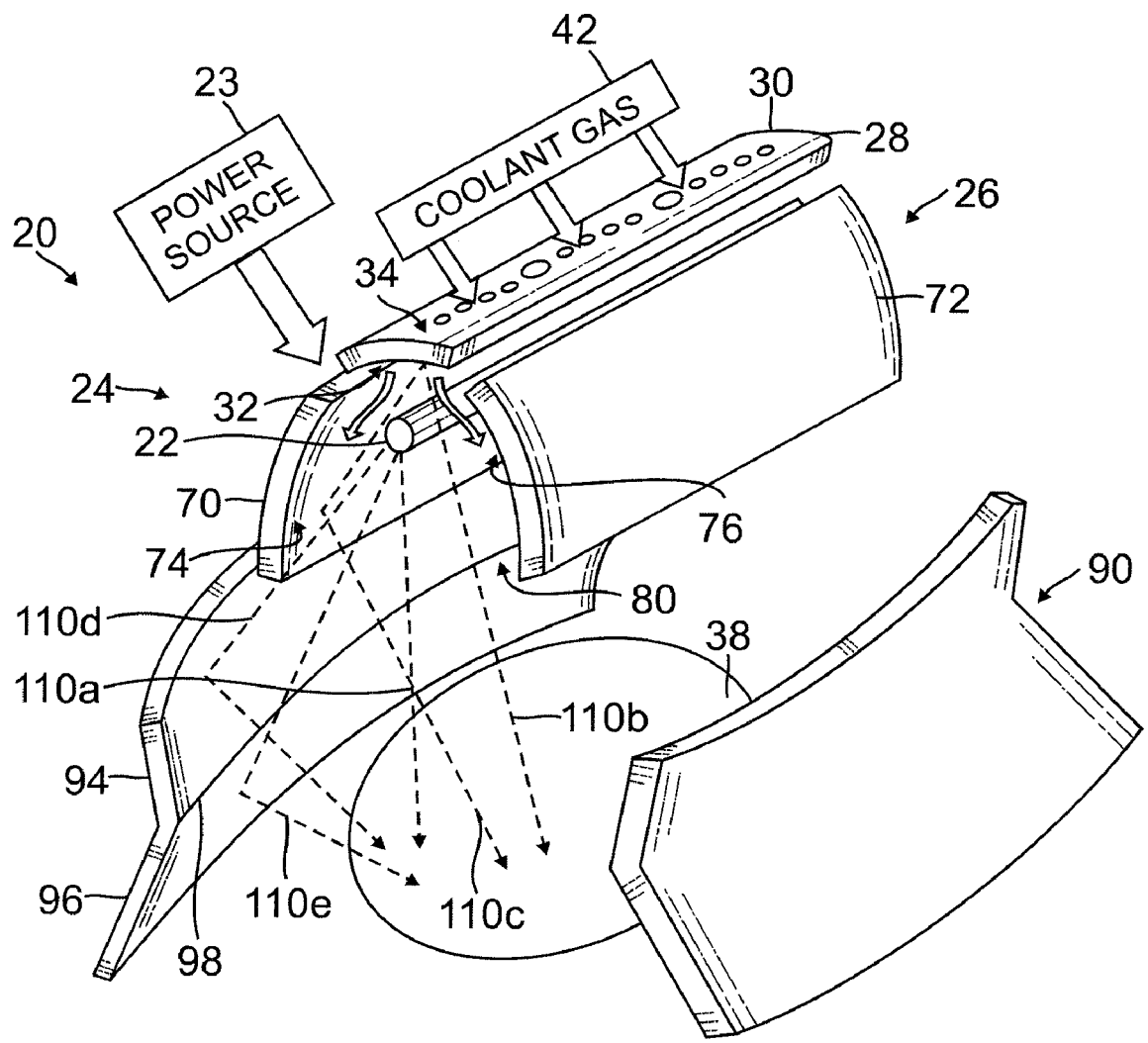
FIG. 1 is a schematic perspective view of an embodiment of an ultraviolet (UV) lamp module comprising a UV lamp and a primary reflector positioned above a quartz window and a substrate.

An embodiment of a ultraviolet (UV) lamp module 20 that can generate ultraviolet radiation to treat substrates 38 such as semiconducting wafers, displays, and solar panels, is shown in FIG. 1. The UV lamp module 20 comprises a UV lamp 22 that emits ultraviolet radiation. The UV lamp 22 can include any UV source such as a mercury microwave arc lamp, pulsed xenon flash lamp, or high-efficiency UV light emitting diode array. In one version, the UV lamp 22 is a sealed plasma bulb filled with a gas such as xenon (Xe) or mercury (Hg), and which is excited by an external power source 23 such as a microwave generator that includes a magnetron and a transformer to energize filaments of the magnetron. In another embodiment, the UV lamp 22 can include a filament which is powered by a power source 23 (shown schematically) that supplies direct current to the filament. The UV lamp 22 can also be powered by a power source 23 comprising a radio frequency (RF) energy source that can excite the gas within the UV lamp 22. The UV lamp 22 is shown as an elongated cylindrical bulb for illustrative purposes; however, UV lamps 22 having other shapes can also be used, such as spherical lamps or arrays of lamps, as would be apparent to one of ordinary skill in the art. A suitable UV lamp 22 is commercially available from, for example, Nordson Corporation in Westlake, Ohio; or from Miltec UV Company in Stevenson, Md. In one version, the UV lamp 22 includes a single elongated UV H+ bulb from Miltec UV Company. The UV lamp 22 may include two or more separate elongated bulbs.

Figure 3A:
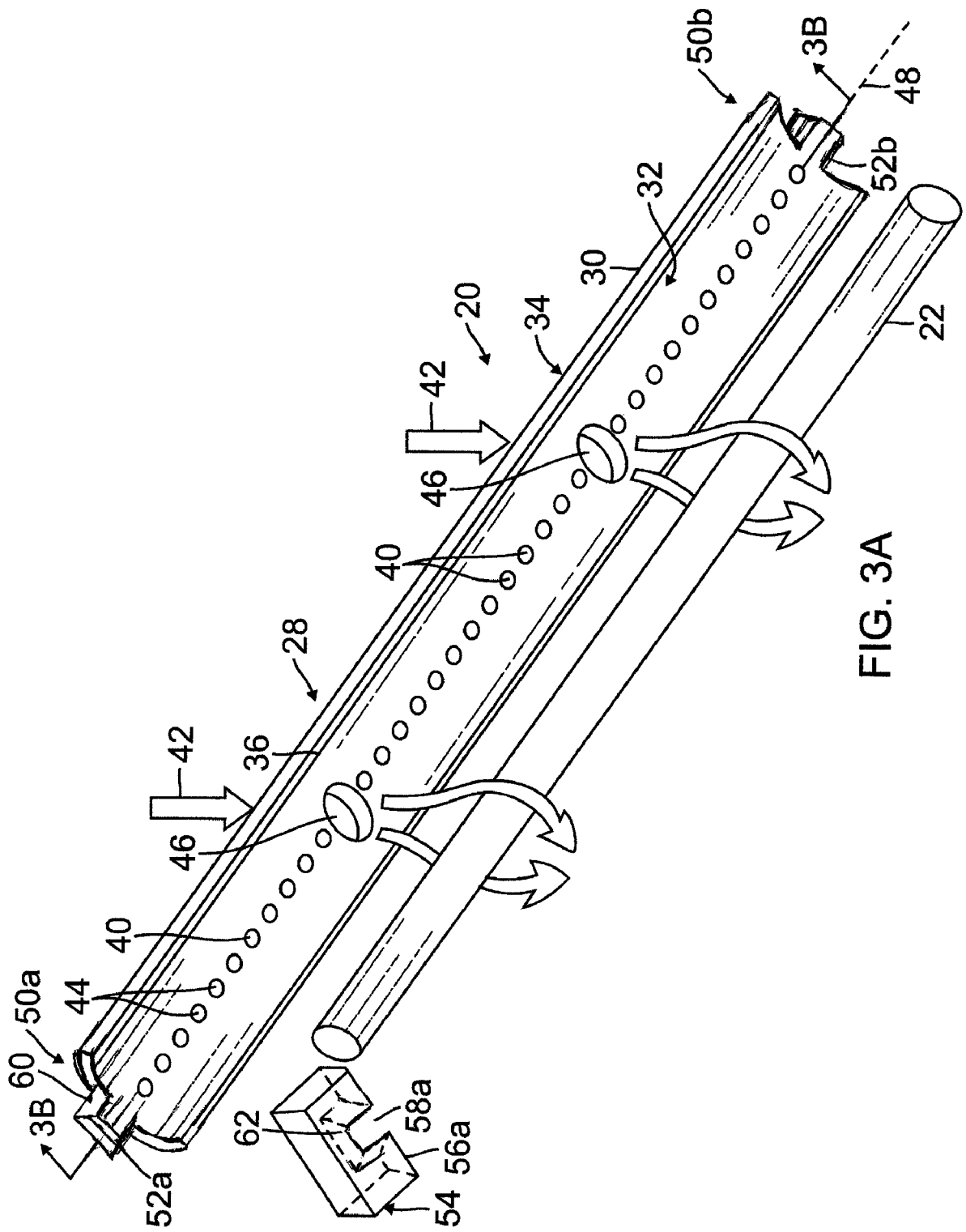
FIG. 3A is a perspective view of a central reflector looking up at the curved reflective surface of the reflector, showing a portion of the reflector holder, and the coolant gas flow through the holes of the central reflector and over the UV lamp.
Figure 3B:
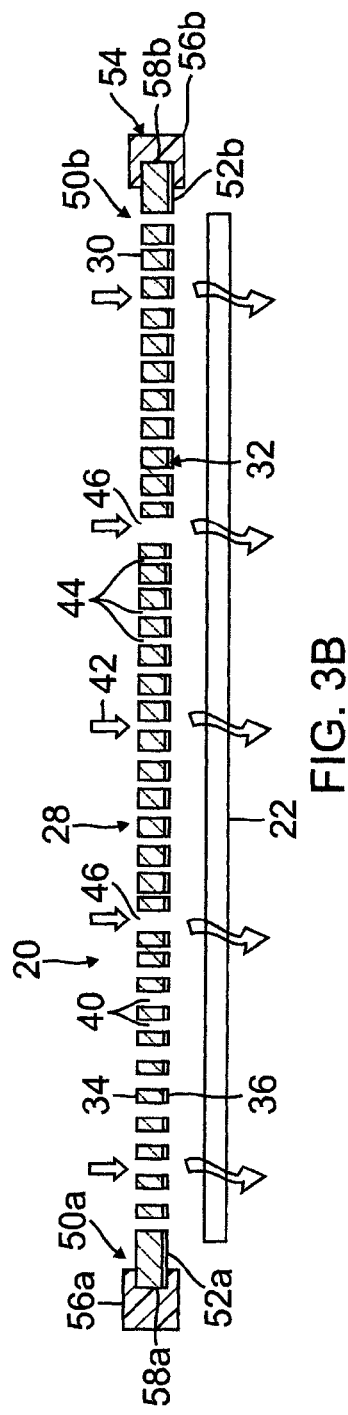
FIG. 3B is a side view of the central reflector taken along viewing line 3B in FIG. 3A, showing the gas flow through the holes and around the UV lamp.

The lamp module 20 includes a reflector assembly 24 that includes a primary reflector 26 that partially surrounds the UV lamp 22 of the ultraviolet lamp module 20. The primary reflector 26 comprises a central reflector 28 that is centrally positioned behind, and in a spaced relationship with respect to, the UV lamp 22. The central reflector 28 comprises a longitudinal strip 30 that extends the length of the ultraviolet lamp, as shown in FIGS. 3A and 3B. The longitudinal strip 30 has a curved reflective surface 32 that is an interior surface and which faces the back of the UV lamp 22 to reflect backward directed rays of ultraviolet radiation emitted by the UV lamp 22 towards the substrate 38. The curved reflective surface 32 of the longitudinal strip 30 is an arcuate surface that can be circular, elliptical, or parabolic. In one version, the curved reflective surface 32 comprises a circular surface with a radius of curvature of at least about 2 cm and less than about 5 cm or even from about 3 to about 4 cm. The longitudinal strip 30 also has a back surface 34, which can be flat, or can be curved to match the curvature of the curved reflective surface 32.

The longitudinal strip 30 is made from a material that allows transmission of infrared radiation and microwaves, and which reflects ultraviolet radiation. In one version, the longitudinal strip 30 comprises quartz. For example, an elongated preform of quartz can be machined to form the longitudinal strip 30. Conventional machining techniques, such as CNC, can be used to machine a cast quartz preform to obtain the desired shape of the longitudinal strip 30 including the curved reflective surface 32 on the front of the strip 30. Thereafter, the curved reflective surface 32 is formed by polishing the interior facing surface using conventional polishing methods so that at least 95% of the surface 32 is free of wrinkles and cracks.

Optionally, a dichroic coating 36 can also be applied to the curved reflective surface 32 of the longitudinal strip 30 to reflect a higher percentage of the backward directed ultraviolet rays toward the substrate 38. The dichroic coating 36 is a thin-film filter that selectively passes through light having a small range of wavelengths while reflecting other wavelengths. In one embodiment, the dichroic coating 36 comprises a multilayer film composed of different dielectric materials. For example, the different dielectric materials can include a plurality of layers having alternating high and low refractive indices, and which are arranged and selected so that the dichroic coating 36 does not reflect all of the damaging heat-generating infrared radiation emitted by the UV lamp 22, but instead allows some of this radiation to pass into the longitudinal strip 30. The quartz material of the strip 30 transmits infrared light and the dichroic coating 36 reflects ultraviolet light emitted by the UV lamp 22. Since the dichroic coating is non-metallic, microwave radiation applied to the UV lamp 22 from a power source (not shown) that is downwardly incident on the backside of the quartz does not significantly interact with, or get absorbed by, the modulated layers and is readily transmitted for ionizing the gas in the UV lamp 22.

Typically, no coating is applied to the back surface 34 of the longitudinal strip 30. However, a secondary reflective coating (not shown) may also be applied to the back surface 34 to reflect back any ultraviolet radiation that passes through the curved reflective surface 32 at the front of the longitudinal strip 30, or to more rapidly dissipate heat accumulated in the longitudinal strip 30 from exposure to the ultraviolet radiation.

A plurality of through holes 40 are provided in the longitudinal strip 30. The holes 40 extend from the back surface 34 to the curved reflective surface 32 to allow a coolant gas 42 to be injected from an external coolant gas source toward the UV lamp 22. The holes 40 include first holes 44 having a first diameter that is larger than a second diameter of the second holes 46. The first and second holes 44, 46 are fined along a central axis 48 of the longitudinal strip 30. For example, the first holes 44 can have a diameter of from about 0.2 mm to about 4 mm, and the second holes 46 can have a diameter of from about 6 mm to about 12 mm. As another example, the total number of first holes 44 can range from about 10 to about 50, and the total number of second holes 46 can range from about 2 to about 6. In addition, the edges of the holes 44, 46 can be angled or sloped to cause the coolant gas 42 to be injected toward the UV lamp 22. A suitable angle can range from about 10° to about 45°, such as 25°.

In one embodiment, each end 50a,b of the longitudinal strip 30 of the central reflector 28 comprises an end tab 52a,b. A reflector holder 54 comprises end holders 56a,b that each have a cutout 58a,b that is shaped so that each end tab 52a,b of the central reflector 28 fits into a cutout 58a,b of an end holder 56a,b, as shown in FIGS. 3A and 3B, to hold the central reflector 28 in place behind the UV lamp 22. The reflector holder 54 can be made of a polymer, such as Teflon® DuPont de Nemours Company, Delaware. In one version, the end tab 52a,b are wedge-shaped tabs that fit into corresponding wedge-shaped cutouts 58a,b of the end holders 56a,b. The wedge-shaped tabs can also have inclined surfaces 60 that match the slope of corresponding inclined surfaces 62 of the wedge-shaped cutouts 58a,b of the end holders 56a,b. This allows the central reflector 28 to be seated from behind the reflector assembly 24 in to the wedge-shaped cutouts 58a,b of the end holders 56a,b to support the central reflector 28.

Figure 4A:
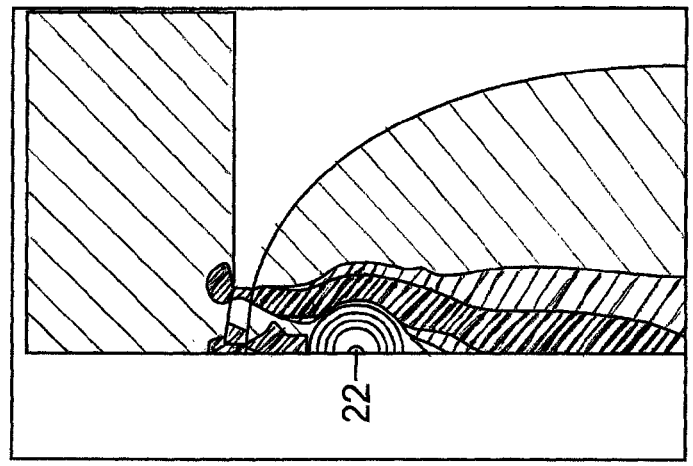
FIGS. 4A and 4B are computer modeled diagrams of the coolant gas in a conventional system (FIG. 4A) and through the holes of a central reflector and around a UV lamp (FIG. 4B)
Figure 4B:
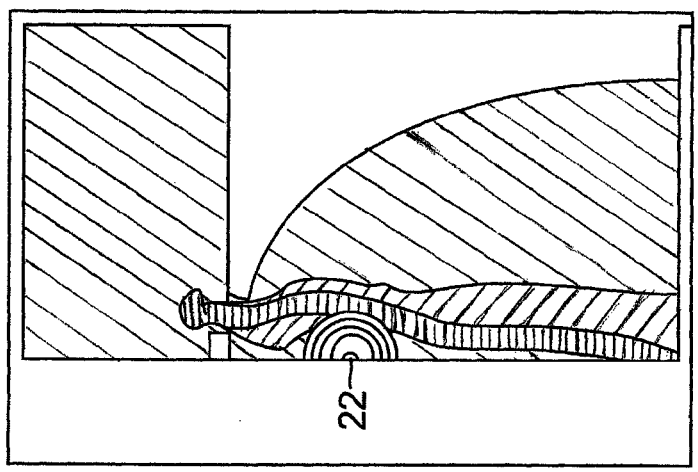

Computer modeled graphs were used to determine the bulb surface temperature based on the flow distribution of gas across a conventional UV source assembly (FIG. 4A) and across an embodiment of a UV lamp module 20 comprising a central reflector 28 having the first holes 44 (FIG. 3B). By contrast, the conventional system comprises a rectangular central reflector plate without holes. In the conventional system, the cooling flow sweeps uniformly past the bulb surfaces on the two sides. However, since the bulb temperature is not uniform, some hot spot areas get less cooling power while other cold areas get excessive cooling flow. As seen from these figures, a substantially enhanced gas flow is obtained using the central reflector 28 with the holes 40 positioned behind the UV lamp 22 as compared to a conventional system. As shown in FIG. 4A, the flow across a UV lamp 22 using a conventional system provides cooling flow that is less focused on the UV lamp 22 surface. In contrast, the flow of coolant gas 42 across a UV lamp 22 when the gas is passed through the first and second holes 44, 46 of the central reflector 28, as shown in FIG. 4B, demonstrates that the cooling flow is effectively direct to the critical top spot of UV lamp 22. This provides a 45° C. lower surface temperature on the UV lamp 22 (from 648° C. to 603° C.). These graphs were modeled using a commercially available Monte Carlo Flow simulation program, CADalyzer®, available from ESI, France. The simulation model used an iterative process that simulated thermal distribution under the given flow condition. While an exemplary modeling simulation is provided, it should be understood that the claimed invention covers modeled versions other than that which is described herein.

Figure 2:
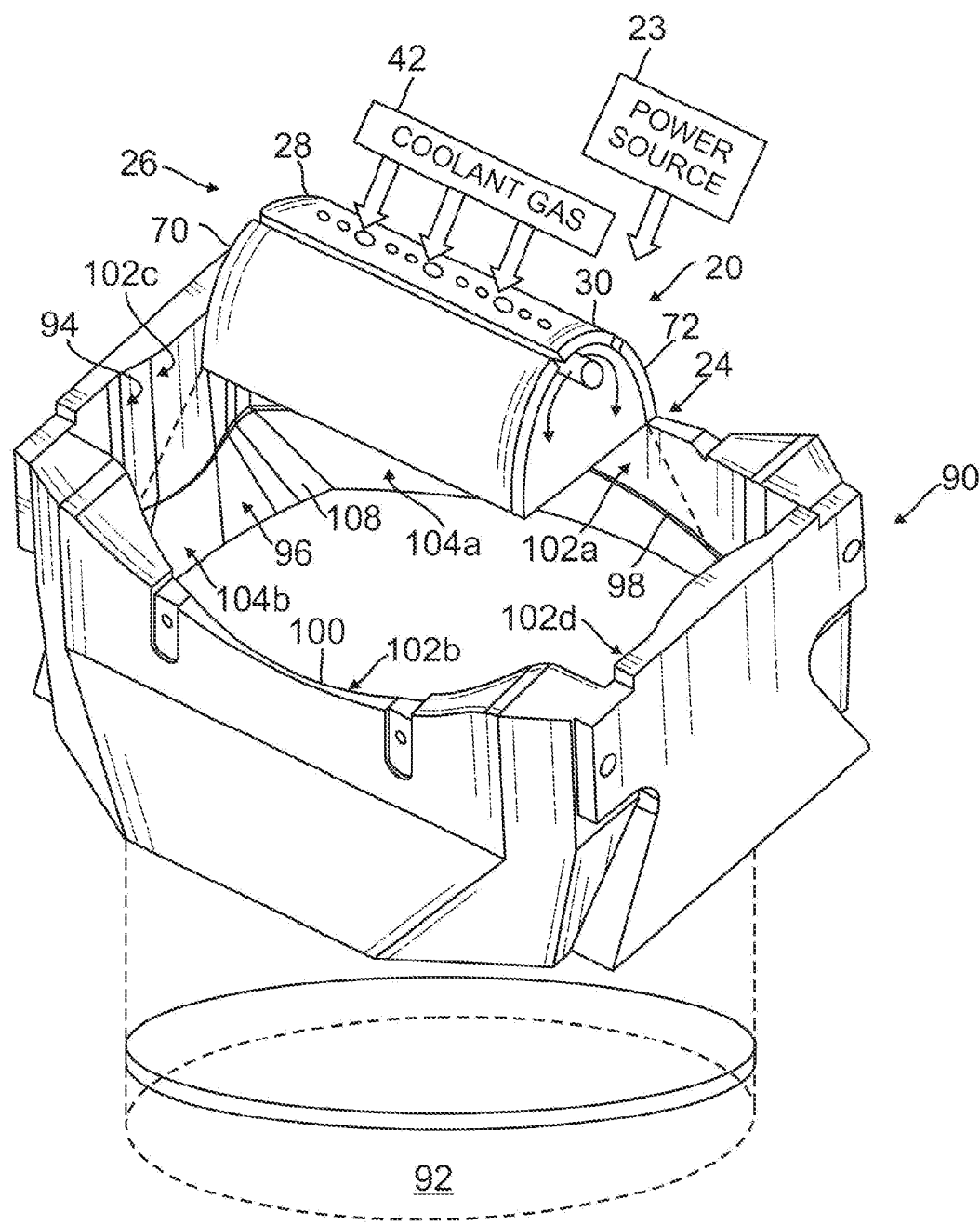
FIG. 2 is a top perspective view of the UV lamp module and a reflector assembly comprising primary and secondary reflectors.

In the version shown in FIGS. 1 and 2, in addition to the central reflector 28, the reflector assembly 24 can also include first and second side reflectors 70, 72, which are positioned on either side of the central reflector 28. The first and second side reflectors 70, 72 can also be made of cast quartz, and have an interior surface that is an arcuate reflective surface 74, 76, respectively. The arcuate reflective surfaces 74, 76 can also have a dichroic coating 36 thereon, which is the same coating material as that used for the central reflector 28. The reflector assembly 24, comprising the central reflector 28 and first and second side reflectors 70, 72, forms an elongated resonant cavity having a parabolic-type surface 80 that meets at a vertex above the UV lamp 22, which traverses the length of the longitudinal strip 30 of central reflector 28, as shown in FIG. 1. Each of the first and second side reflectors 70, 72 extends longitudinally beyond the length of the UV lamp 22.

Any of the central and side reflectors 28, 70, 72, respectively, may be elliptical or parabolic reflectors, or include a combination of both elliptical and parabolic reflective portions. Elliptical reflectors can fit in a smaller resonant cavity for the same width of light beam than parabolic reflectors and can also achieve superior light uniformity as compared to parabolic reflectors. However, reflectors 28, 70, 72 having both elliptical and parabolic sections allow more flexibility in creating reflection patterns tailored to an application. Further, an elliptical reflector need not have a true or perfect ellipse shape. Instead, a reflector that has a partial or semi-elliptical shape that does not have a clearly defined focal point is also referred to as an elliptical reflector. Similarly, a parabolic reflector need not have a true or perfect parabolic shape. Instead, a reflector that has a partial or semi-parabolic shape that reflects rays that are not exactly parallel is also referred to as a parabolic reflector. It should also be noted that while the reflectors 28, 70, 72 are shown as separate unconnected panels as an illustrative embodiment, the invention is not limited to the same, and the reflectors 28, 70 and 72 can be connected as a single U-shaped component that may or may not include longitudinal apertures.

The reflector assembly 24 controls the irradiance profile from the UV lamp 22 and can compensate for direct light non-uniformity (irradiance along a UV lamp is a function of distance from the center of the source). In the embodiment shown, in which a single UV lamp 22 is used to irradiate a substrate 38, the first and second side reflectors 70, 72 have arcuate reflective surfaces 74, 76 which are opposing symmetric reflective surfaces. However, in other embodiments, for example, when two or more UV lamps 22 are used to irradiate a substrate 38, asymmetric pairs of side reflectors (not shown) can also be used as described.

The reflector assembly 24 can also include a secondary reflector 90 in addition to the primary reflector 26, as shown in FIGS. 1 and 2. The secondary reflector 90 further channels and redirects UV radiation that would otherwise fall outside the boundary of the primary reflector's flood pattern so that this reflected radiation impinges upon the substrate 38 being treated to increase the intensity of the energy radiating the substrate 38. The secondary reflector 90 represents a complex shape that can be customized to a particular UV lamp 22 and/or primary reflector 26. The secondary reflector 90 can also be customized (in conjunction with the primary reflectors 26 when used) to particular irradiance profiles and uniformity levels depending on the requirements of an application. For example, in some embodiments, the secondary reflector 90 can be designed to generate an edge high irradiance profile in order to compensate for a heater thermal profile that is center high. Also, the secondary reflector 90 will generally be designed to generate different irradiation patterns depending on whether it is used with a stationary or rotational lamp as discussed below.

As shown in FIG. 2, the secondary reflector 90 alters the flood pattern of UV lamp 22 from a substantially rectangular area to a substantially circular shape 92 that corresponds to the substantially circular semiconductor substrate 38 being exposed. The secondary reflector 90 includes an upper portion 94 and a lower portion 96 which meet at a vertex 98 that extends around the interior perimeter of the reflector 90. Upper portion 94 includes a semicircular cutout 100 to allow unobstructed flow of cooling air to the UV lamp 22. The upper portion 94 also includes two opposing and generally inward sloping (from the top) longitudinal surfaces 102a,b and two opposing transverse surfaces 102c,d. Transverse surfaces 102c,d are generally vertical and have a convex surface along the transverse direction. Longitudinal surfaces 102a,b are generally concave along the longitudinal direction.

Lower portion 96, which is positioned directly below upper portion 94, includes two opposing and generally outward sloping (from the top) surfaces 104a and two opposing generally outward sloping transverse surfaces 104b. In the embodiment shown, the surfaces 104a,b are at a reduced angle (relative to the vertical) than surfaces 102a,b. The longitudinal surfaces 102a,b are generally concave along the longitudinal direction while opposing transverse surfaces 102c,d are generally convex (with a notable exception being in corners 108 where the lower portion of surfaces 102a,b meets the lower portion of surface 102c,d along the transverse direction.

Simplified reflection paths for UV radiation emitted from the UV lamp 22 and reflected by the primary and secondary reflectors 26, 90, respectively, are shown in FIG. 1. As shown, the combination of the primary reflector 26 and the secondary reflector 90 allows substantially all UV radiation emitted by lamp 22 to be directed towards and impinge upon the substrate 38. The radiation from the lamp 22 can impinge upon the substrate 38 by different exemplary paths, which include a path 110a that strikes substrate 38 directly without being reflected from either the primary reflector 26 or secondary reflector 90, a path 110b that strikes the substrate 38 after being reflected by the central reflector 28, a path 110c that strikes the substrate 38 after being reflected by the first side reflector 70, a path 110d that strikes the substrate 38 after being reflected by the upper portion 94 of the secondary reflector 90, and a path 110e that strikes substrate 38 after being reflected by the lower portion 96 of the secondary reflector 90. It is to be understood that the paths 110a-e are exemplary paths only and that many other reflection paths will be generated directly from the lamp 22, or reflected from the primary reflector 26 or secondary reflector 90.

Figure 5:
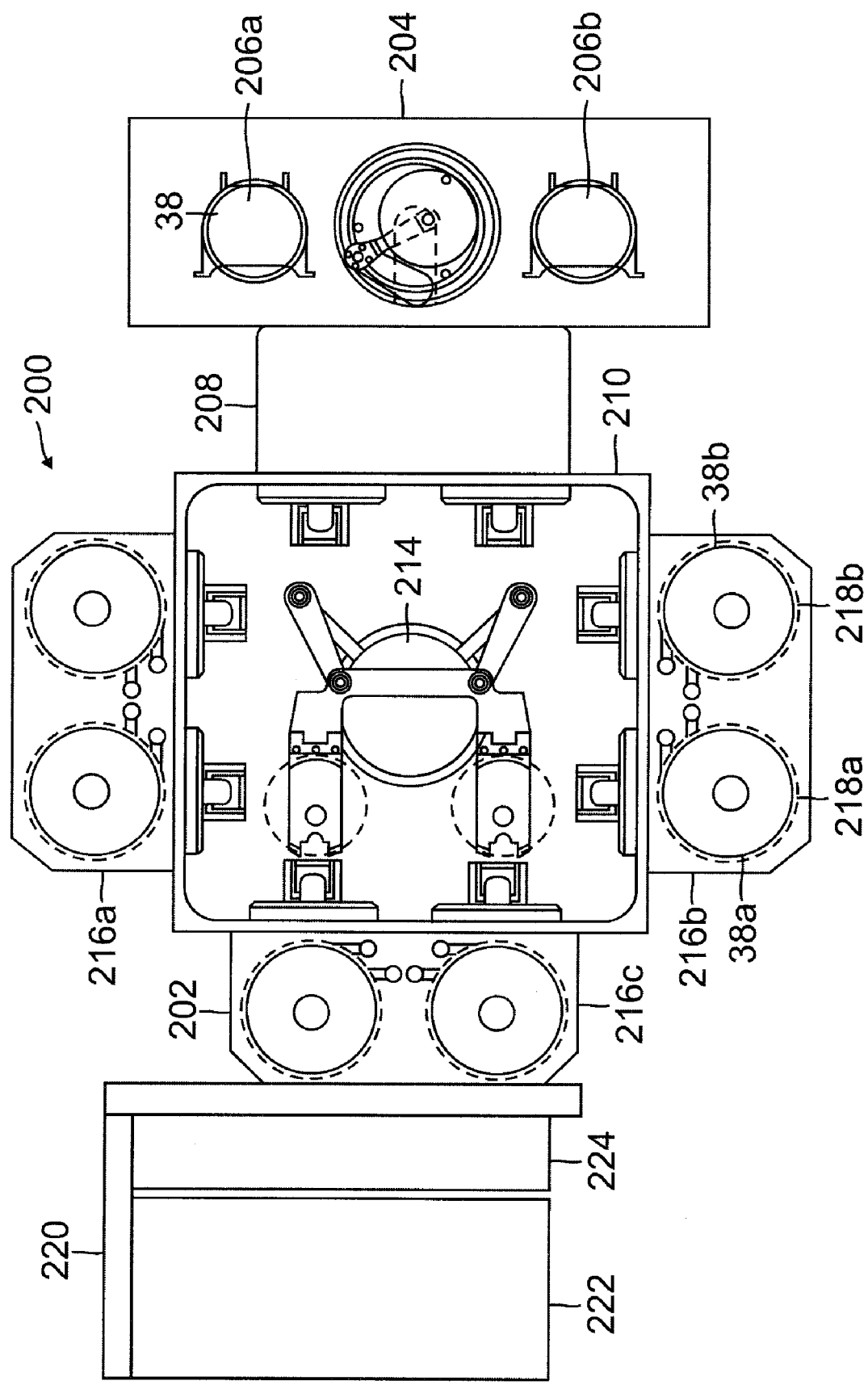
FIG. 5 is a schematic cross-sectional view of a tandem chamber according to an embodiment of the present invention.
Figure 6:
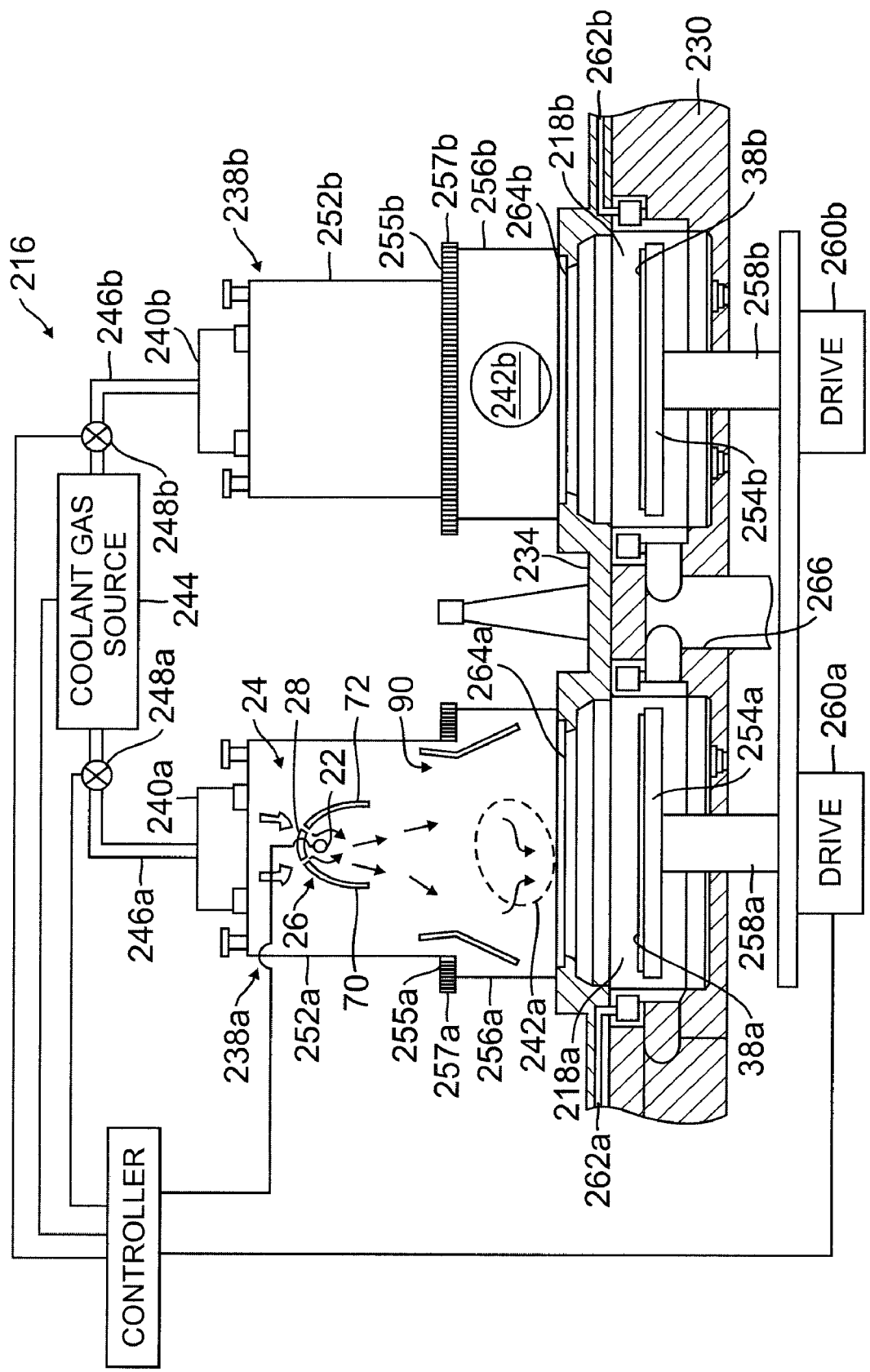
FIG. 6 is a schematic top plan view of a substrate processing apparatus according to an embodiment of the present invention.

The ultraviolet lamp module 20 as described herein can be used in many different types of substrate processing apparatus including, for example, semiconductor processing apparatus, solar panel processing apparatus, and display processing apparatus. An exemplary substrate processing apparatus 200, which can be used to process semiconductor wafers such as silicon or compound semiconductor wafers, is shown in FIGS. 5 and 6. The apparatus 200 illustrates one embodiment of a Producer™ processing system, commercially available from Applied Materials, Inc., of Santa Clara, Calif. The apparatus 200 is a self-contained system having the necessary processing utilities supported on a mainframe structure 202, as shown in FIG. 5. The apparatus 200 generally includes: a cassette loading chamber 204, where substrate cassettes 206a,b are supported to allow loading and unloading of substrates 38 into and from a loadlock chamber 208; a transfer chamber 210 housing a substrate handler 214; and a series of tandem process chambers 216a-c that are mounted on the transfer chamber 210. A utility end 220 houses the support utilities needed for operation of the apparatus 200, such as a gas panel 222, and a power distribution panel 224.

Each of the tandem process chambers 216a-c includes process zones 218a,b (as shown for chamber 216b) capable of processing substrates 38a,b, respectively. The two process zones 218a,b share a common supply of gases, common pressure control and common process gas exhaust/pumping system, allowing rapid conversion between different configurations. The arrangement and combination of chambers 216a-c may be altered for purposes of performing specific process steps. Any of the tandem process chambers 216a-c can include a lid as described below that includes one or more UV lamps 22 for use to treat material on a substrate 38 and/or for a chamber cleaning process. In the embodiment shown, all three of the tandem process chambers 216a-c have UV lamps 22 and are configured as UV curing chambers to run in parallel for maximum throughput. However, in alternative embodiments, all of the tandem process chambers 216a-c may not be configured as UV treatment chambers, and the apparatus 200 can be adapted to have chambers that perform other processes such as chemical vapor deposition (CVD), physical vapor deposition (PVD), etch, or combinations of these processes and UV treatment performed in the same chamber. For example, the apparatus 200 can be configured with one of the tandem process chambers 216a-c as a CVD chamber for depositing materials, such as a low dielectric constant (K) film, on a substrate 38.

An embodiment of a tandem process chamber 216 of the apparatus 200 that is configured for UV treatment of substrates 38 such as semiconducting wafers, is shown in FIG. 6. The process chamber 216 includes a body 230 and a lid 234 that can be hinged to the body 230. Coupled to the lid 234 are two housings 238a,b that are each coupled to inlets 240a,b along with outlets 242a,b for passing a coolant gas through an interior of the housings 238a,b. The coolant gas is obtained from a coolant gas source 244, via the pipes 246a,b, and flow controllers 248a,b, and the coolant gas can be at room temperature or lower, such as approximately 22° C. The coolant gas source 244 provides coolant gas at a sufficient pressure and flow rate to the inlets 240a,b to ensure proper operation of the UV lamps 22 and/or power sources for the lamps associated with the tandem process chamber 216a-c. Details of a cooling module that can be used in conjunction with tandem process chamber 216 can be found in commonly assigned U.S. application Ser. No. 11/556,642, entitled "Nitrogen Enriched Cooling Air Module for UV Curing System," filed on Nov. 3, 2006, which is incorporated by reference herein and in its entirety. The formation of ozone can be avoided by cooling the lamps with oxygen-free coolant gas (e.g., nitrogen, argon or helium). In one version, the coolant gas source 244 provides a coolant gas comprising nitrogen at a flow rate of from about 200 to 2000 sccm. The outlets 242a,b receive the exhausted coolant gas from the housings 238a,b, which is collected by a common exhaust system (not shown) that can include a scrubber to remove ozone potentially generated by the UV bulbs depending on bulb selection.

Each of the housings 238a,b covers one of two UV lamps 22 disposed respectively above two process zones 218a,b defined within the body 230. While a single UV lamp 22 is shown above each of the process zones 218a,b, it should be noted that multiple UV lamps 22 can be used to increase the total irradiation, as for example described in U.S. Patent Application Publication No. US 2007/0257205A1, entitled, "APPARATUS AND METHOD FOR TREATING A SUBSTRATE WITH UV RADIATION USING PRIMARY AND SECONDARY REFLECTORS," filed on Mar. 15, 2007, which is incorporated by reference herein in its entirety. Each of the housings 238a,b comprises an upper housing 252a,b in which the UV lamp 22 is positioned, and a lower housing 256a,b in which the secondary reflector 90 is placed. In the version shown, a disc 255a,b having a plurality of teeth 257a, b, respectively, that grip a corresponding belt (not shown) that couples the disc to a spindle (not shown) which in turn is operatively coupled to a motor (not shown). The discs 255a,b, belts, spindle, and motor allow the upper housings 252a,b (and the UV lamps 22 mounted therein) to be rotated relative to a substrate 38a,b positioned on a the substrate support 254a,b. Each secondary reflector 90 is attached to the bottom of respective disc 255a,b by a bracket (not shown) which allows the secondary reflectors 90 to rotate within the lower housings 256a,b along with the upper housings 252a,b and UV lamps 22. Rotating the UV lamp 22 relative to the substrate 38a,b being exposed improves the uniformity of exposure across the surface of the substrate. In one embodiment, the UV lamps 22 can be rotated at least 180 degrees relative to the substrate 38a,b being exposed, and in other embodiments the UV lamps 22 can be rotated 270 degrees or even a full 360 degrees.

Each of the process zones 218a,b includes a substrate support 254a,b for supporting a substrate 38a,b within the process zones 218a,b. The supports 254a,b can be heated, and can be made from ceramic or metal such as aluminum. Preferably, the supports 254a,b couple to stems 258a,b that extend through a bottom of the body 230 and are operated by drive systems 260a,b to move the supports 254a,b in the process zones 218a,b toward and away from the UV lamps 22. The drive systems 260a,b can also rotate and/or translate the supports 254a,b during curing to further enhance uniformity of substrate illumination. Adjustable positioning of the supports 254a,b also enables control of volatile cure by-product and purge and clean gas flow patterns and residence times in addition to potential fine tuning of incident UV irradiance levels on the substrate 38 depending on the nature of the light delivery system design considerations such as focal length.

In the version shown, the UV lamp 22 is an elongated cylindrical sealed plasma bulb filled with mercury for excitation by a power source (not shown). In one version, the power source is a microwave generator that includes a magnetron and a transformer to energize filaments of the magnetrons. In one version, a kilowatt microwave power source generates microwaves is adjacent to an aperture (not shown)

in the housings 238a,b and transmits microwaves through the aperture which are applied to a UV lamp 22. A power source that provides up to 6000 Watts of microwave power can generate up to about 100 W of UV light from each of the UV lamps 22. In one version, the UV lamp 22 emits UV light across a broad band of wavelengths from 170 nm to 400 nm. The gases in the UV lamp 22 determines the wavelengths emitted, and since shorter wavelengths tend to generate ozone when oxygen is present, UV light emitted by the UV lamps 22 can be tuned to predominantly generate broadband UV light above 200 nm to avoid ozone generation during UV treatment processes.

The UV light emitted from each UV lamp 22 enters one of the process zones 218a,b by passing through windows 264a,b disposed in apertures in the lid 234. In one version, the windows 264a,b are made of a synthetic quartz glass and have sufficient thickness to maintain vacuum without cracking. For example, the windows 264a,b can be made from OH free fused silica that transmits UV light down to approximately 150 nm. The lid 234 seals to the body 230 so that the windows 264a,b are sealed to the lid 234 to provide process zones 218a,b having volumes capable of maintaining pressures from approximately 1 Torr to approximately 650 Torr. Process gases enter the process zones 218a,b via one of two inlet passages 262a,b and exit the process zones 218a,b via the common exhaust port 266. Also, the coolant gas supplied to the interior of the housings 238a,b circulates past the UV lamps 22 but is isolated from the process zones 218a,b by the windows 264a,b.

An exemplary ultraviolet treatment process, in which a low-k dielectric material comprising silicon-oxygen-carbon is cured, will now be described. For such curing processes, the supports 254a,b are heated to between 350° C. and 500° C., and the process zones 218a,b are maintained at a gas pressure of from about 1 to about 10 Torr to enhance heat transfer to the substrate 38 from the supports 254a,b. In the curing process, helium is introduced at a flow rate of 14 slm at a pressure of 8 Torr in each of the tandem chambers 216a-c (7 slm per side of the twin) via each of the inlet passages 262a,b. For some embodiments, the cure processes can also use nitrogen ($N_2$) or argon (Ar) instead of or in mixture with helium (He). The purge gas removes curing by-products, promotes uniform heat transfer across the substrates 38a,b, and minimizes residue build up on the surfaces within the process zones 218a,b. Hydrogen can also be added to remove some methyl groups from films on the substrates 38 and to scavenge oxygen released during curing.

In another embodiment, the curing process uses a pulsed UV lamp 22 which can comprise a pulsed xenon flash lamp. The process zones 218a,b are maintained under vacuum at pressures of from about 10 mtorr to about 700 Torr, while the substrates 38a,b are exposed to pulses of UV light from the UV lamps 22. The pulsed UV lamps 22 can provide a tuned output frequency of the UV light for various applications.

A cleaning process can also be performed in the process zones 218a,b. In this process, the temperature of the supports 254a,b can be raised to between about 100° C. to about 600° C. In the cleaning process, elemental oxygen reacts with hydrocarbons and carbon species that are present on the surfaces of the process zones 218a,b to form carbon monoxide and carbon dioxide that can be pumped out or exhausted through the exhaust port 266. A cleaning gas such as oxygen can be exposed to UV radiation at selected wavelengths to generate ozone in situ. The power sources can be turned on to provide UV light emission from the UV lamps 22 in the desired wavelengths, preferably about 184.9 nm and about 253.7 nm when the cleaning gas is oxygen. These UV radiation wavelengths enhance cleaning with oxygen because oxygen absorbs the 184.9 nm wavelength and generates ozone and elemental oxygen, and the 253.7 nm wavelength is absorbed by the ozone, which devolves into both oxygen gas as well as elemental oxygen. In one version of a cleaning process, process gas comprising 5 slm of ozone and oxygen (13 wt % ozone in oxygen) was flowed into the tandem process chambers 216a,b, split evenly within each process zone 218a,b to generate sufficient oxygen radicals to clean deposits from surfaces within the process zones 218a,b. The $O_3$ molecules can also attack various organic residues. The remaining $O_2$ molecules do not remove the hydrocarbon deposits on the surfaces within the process zones 218a,b. A sufficient cleaning process can be performed with a 20-minute cleaning process at 8 Torr after curing six pairs of substrates 38a,b.

Although exemplary embodiments of the present invention are shown and described, those of ordinary skill in the art may devise other embodiments which incorporate the present invention, and which are also within the scope of the present invention. Furthermore, the terms "below", "above", "bottom", "top", "up", "down", "first" and "second" and other relative or positional terms are shown with respect to the exemplary embodiments in the figures are interchangeable. Therefore, the appended claims should not be limited to the descriptions of the preferred versions, materials, or spatial arrangements described herein to illustrate the invention.

What is claimed is:

1. An ultraviolet lamp reflector comprising a longitudinal strip extending along the length of the ultraviolet lamp, the longitudinal strip comprising:
   (a) a curved reflective surface;
   (b) a plurality of through holes to direct a coolant gas toward an ultraviolet lamp; and
   (c) an end tab at each end.

2. A reflector according to claim 1 wherein the curved reflective surface comprises a radius of curvature of at least about 2 cm.

3. A reflector according to claim 1 wherein the curved reflective surface comprises a radius of curvature of less than about 5 cm.

4. A reflector according to claim 1 wherein the plurality of through holes comprises first holes having a first diameter and second holes having a second diameter, the first diameter being larger than the second diameter.

5. A reflector according to claim 4 wherein the first and second holes are aligned along a central axis of the longitudinal strip.

6. A reflector according to claim 1 wherein the end tabs are wedge shaped.

7. A reflector according to claim 1 further comprising polymeric end holders that each have a cutout, and wherein each end tab of the reflector fits into a cutout of an end holder.

8. A reflector according to claim 1 comprising quartz.

9. A reflector according to claim 1 wherein the curved reflective surface of the longitudinal strip comprises a dichroic coating.

10. A reflector assembly comprising the reflector of claim 1 in a central position, and further comprising first and second side reflectors positioned on either side of the centrally positioned reflector.

11. A reflector assembly according to claim 10 wherein the centrally positioned reflector and the first and second side reflectors form a parabolic-type surface that meets at a vertex traversing a length of the longitudinal strip.

12. A reflector assembly according to claim 10 wherein the centrally positioned reflector and the first and second side reflectors constitute a primary reflector and further comprising a secondary reflector positioned between the primary reflector and a substrate support, the secondary reflector comprising upper and lower sections, each of which includes (i) opposing longitudinal surfaces having ends, and (ii) opposing transverse surfaces extending between the ends of the longitudinal surfaces.

13. An ultraviolet lamp module comprising the reflector assembly of claim 10 and further comprising an elongated ultraviolet lamp.

14. A substrate process chamber comprising:
(1) a substrate support; and
(2) an ultraviolet lamp module according to claim 13.

15. A substrate process chamber comprising:
(a) a substrate support; and
(b) an ultraviolet lamp module comprising:
  (i) an elongated ultraviolet lamp spaced apart from the substrate support, the ultraviolet lamp configured to transmit ultraviolet light toward the substrate support; and
  (ii) a primary reflector comprising:
    (1) a central reflector comprising a longitudinal strip extending along the length of the elongated ultraviolet lamp, the longitudinal strip having end tabs at each end, a curved reflective surface, and a plurality of through holes provided to direct a coolant gas toward the elongated ultraviolet lamp; and
    (2) first and second side reflectors positioned on either side of the central reflector.

16. A chamber according to claim 15 wherein the curved reflective surface of the longitudinal strip of the central reflector comprises a radius of curvature of from about 2 cm to about 5 cm.

17. A chamber according to claim 15 wherein the plurality of through holes comprises first and second holes that are lined along a central axis of the longitudinal strip, the first holes having a first diameter that is larger than a second diameter of the second holes.

18. A chamber according to claim 15 wherein the primary reflector comprises a pair of polymeric end holders that each have a cutout, and wherein each end tab of the longitudinal strip of the central reflector fits into a cutout of an end holder.

19. A chamber according to claim 15 wherein the central reflector comprises quartz.

20. A chamber according to claim 15 wherein the curved reflective surface of the longitudinal strip comprises a dichroic coating.

21. A chamber according to claim 15 wherein the central reflector and the first and second side reflectors form a parabolic-type surface that meets at a vertex traversing a length of the longitudinal strip.

22. A chamber according to claim 15 further comprising a secondary reflector positioned between the primary reflector and the substrate support, the secondary reflector comprising upper and lower sections, each of which includes (i) opposing longitudinal surfaces having ends, and (ii) opposing transverse surfaces extending between the ends of the longitudinal surfaces.

23. A chamber according to claim 15 further comprising a window separating the ultraviolet lamp from the substrate support.

24. A method of treating a substrate with ultraviolet radiation, the method comprising:
(a) providing a substrate in a process zone;
(b) energizing an ultraviolet lamp to generate ultraviolet radiation;
(c) supporting a longitudinal strip having a curved reflective surface behind the ultraviolet lamp with end tabs at each end of the longitudinal strip to reflect the generated ultraviolet radiation toward the substrate; and
(d) directing a plurality of streams of coolant gas through holes in the curved reflective surface to cool the ultraviolet lamp.

25. A method according to claim 24 comprising directing a plurality of streams of coolant gas through holes having different diameters.

26. A method according to claim 24 comprising directing coolant gas comprising nitrogen.

27. A method according to claim 24 comprising exposing a layer of low-k dielectric material formed on the substrate to the ultraviolet radiation to cure the dielectric layer.

28. An ultraviolet lamp reflector assembly comprising:
(a) a central reflector comprising a longitudinal strip having a curved reflective surface and a plurality of through holes;
(b) first and second side reflectors positioned on either side of the central reflector; and
(c) a secondary reflector below the central reflector, the secondary reflector comprising upper and lower sections, each of which includes (i) opposing longitudinal surfaces having ends, and (ii) opposing transverse surfaces extending between the ends of the longitudinal surfaces.

29. A reflector assembly according to claim 28 wherein at least one of the central reflector, first and second side reflectors, and secondary reflector comprises quartz.

30. A reflector assembly according to claim 28 wherein the central reflector and first and second reflectors form a parabolic-type surface that meets at a vertex traversing a length of the longitudinal strip.

31. A reflector assembly according to claim 28 wherein at least one of the central reflector, first and second reflectors, and secondary reflector comprises a radius of curvature of from about 2 cm to about 5 cm.

32. An ultraviolet lamp module comprising the reflector assembly of claim 28 and further comprising an elongated ultraviolet lamp.

33. A module according to claim 32 further comprising a window separating the ultraviolet lamp from a substrate support in a process chamber.

34. An ultraviolet lamp reflector comprising a longitudinal strip extending along the length of an ultraviolet lamp, the longitudinal strip having:
(a) a curved reflective surface; and
(b) a plurality of through holes to direct a coolant gas toward an ultraviolet lamp, the through holes comprising edges that are angled or sloped.

35. A reflector according to claim 34 comprising quartz.

36. A reflector according to claim 34 wherein the through holes are angled at an angle of from about 10° to about 45°.

37. A reflector according to claim 34 wherein the through holes comprise first and second holes, the first holes having a first diameter that is larger than a second diameter of the second holes.

38. An ultraviolet lamp module comprising the reflector of claim 34 and further comprising an elongated ultraviolet lamp.

39. A substrate process chamber comprising:
(1) a substrate support; and
(2) an ultraviolet lamp module according to claim 38.

40. A primary reflector assembly comprising the reflector of claim 34 in a central position, and further comprising first and second side reflectors positioned on either side of the centrally positioned reflector.

41. A reflector assembly comprising the primary reflector assembly of claim 40 and further comprising a secondary reflector, the secondary reflector comprising upper and lower sections, each of which includes (i) opposing longitudinal surfaces having ends, and (ii) opposing transverse surfaces extending between the ends of the longitudinal surfaces.

42. A method of treating a substrate with ultraviolet radiation, the method comprising:
(a) providing a substrate in a process zone;
(b) energizing an ultraviolet lamp to generate ultraviolet radiation;
(c) positioning a longitudinal strip having both a curved reflective surface and holes having edges that are angled or sloped to reflect the generated ultraviolet radiation toward the substrate; and
(d) directing a plurality of streams of coolant gas into the holes having edges that are angled or sloped to cause the coolant gas to be injected toward the ultraviolet lamp.

43. A method according to claim 42 comprising injecting a plurality of streams of coolant gas through holes having different diameters.

44. A method according to claim 42 comprising injecting coolant gas comprising nitrogen.

* * * * *